United States Patent [19]

Yoshida et al.

[11] 4,060,913
[45] Dec. 6, 1977

[54] ASSEMBLY FOR DEHYDRATING AIR TO BE SUPPLIED TO BLAST FURNACE

[75] Inventors: Toru Yoshida, Hachioji; Kameo Hosoi, Warabi; Tokuzo Yoshida, Oita; Kazuyuki Shimizu, Bungotakada; Koithiro Nakagawa, Oita, all of Japan

[73] Assignees: Takasago Thermal Engineering Co., Ltd; Nippon Steel Corporation, Japan

[21] Appl. No.: 710,567

[22] Filed: Aug. 2, 1976

[51] Int. Cl.² .............................................. F26B 21/06
[52] U.S. Cl. ............................................ 34/80; 432/40; 432/180; 165/8; 62/90;271
[58] Field of Search ................... 62/90, 93, 94, 176 D, 62/271; 165/8-10, 59, 66, 107; 34/80, 79, 82, 71, 75, 76; 432/179-181, 223

[56] References Cited

U.S. PATENT DOCUMENTS

| 3,844,737 | 10/1974 | Macriss et al. | 62/271 |
| 3,855,719 | 12/1974 | Jonsson | 34/9 |
| 3,921,413 | 11/1975 | Kohlbeck | 62/90 |
| 4,000,775 | 1/1977 | Eisenstein | 165/8 |

FOREIGN PATENT DOCUMENTS

| 2,238,551 | 2/1973 | Germany | 34/75 |

Primary Examiner—John J. Camby
Assistant Examiner—Henry C. Yuen
Attorney, Agent, or Firm—Kane, Dalsimer, Kane, Sullivan and Kurucz

[57] ABSTRACT

Assembly for dehydrating atmospheric air at the input side of a blower for supplying air to a blast furnace comprising at least one gas permeable rotor containing a regenerative moisture absorbent wherein a hot combustion gas obtained by burning a waste gas from the blast furnace is utilized for regenerating the absorbent and wherein means for regulating the relative humidity of the moist air to be dehydrated, which does not need any external heat source, is provided to avoid deliquescence of the absorbent. The rotor preferably comprises a layer containing the absorbent and a layer of an adsorbent capable of adsorbing impurities contained in the air.

6 Claims, 9 Drawing Figures

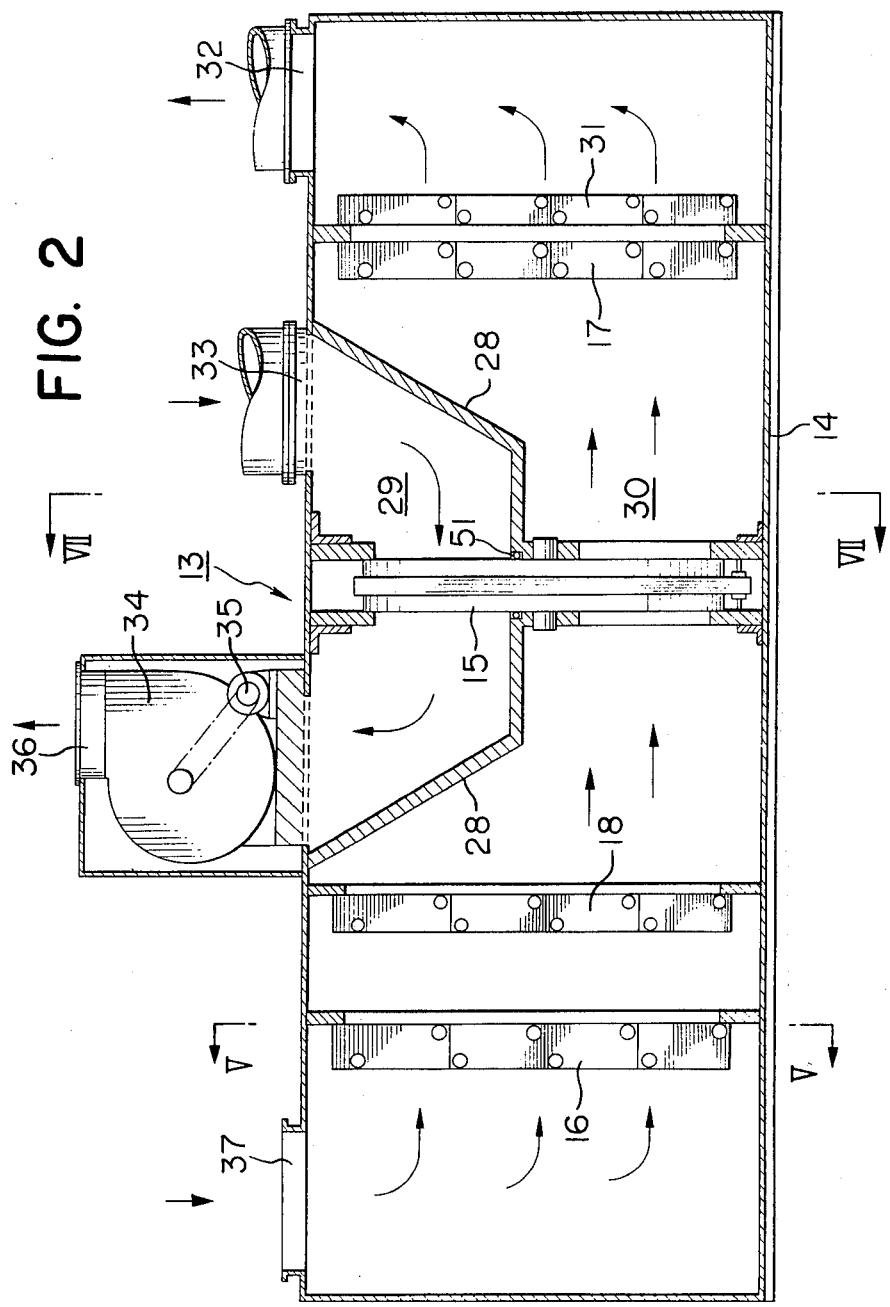

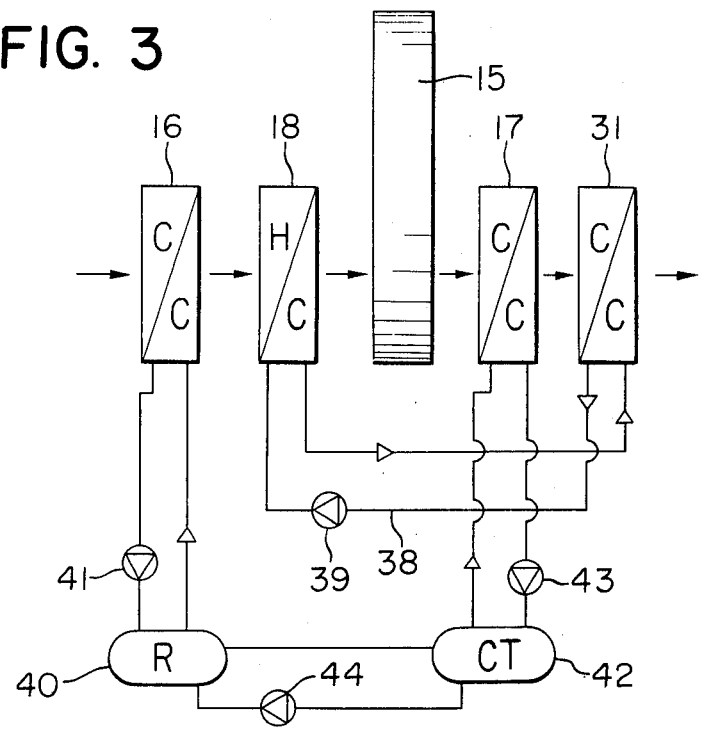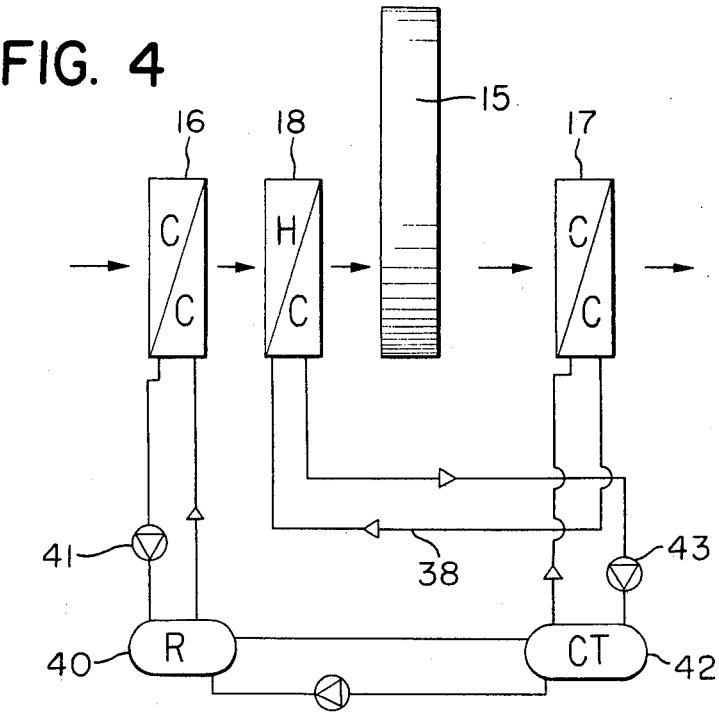

ASSEMBLY FOR DEHYDRATING AIR TO BE SUPPLIED TO BLAST FURNACE

The present invention relates to an assembly for dehydrating air to be supplied to a blast furnace. More particularly, it relates to such an assembly wherein a combustion gas obtained by burning a waste gas containing inflammable components, such as a waste gas from a blast furnace, is utilized for the regeneration of a regenerative moisture absorbent and wherein a relative humidity regulator, which does not need any external heat source, is provided for preventing the regenerative capacity of the moisture absorbent from being lowered.

In operation of a blast furnace variations in the moisture content of air supplied to the blast furnace cause the reactions in the furnace to undesirably fluctuate, and excessive moisture contents often adversely affect those reactions. Accordingly, it is desired that the moisture content of air supplied to a blast furnace be controlled so that it does not exceed a predetermined level irrespective of the seasons of the year.

Dehydration of air in the operation of a blast furnace involves various problems which are not encountered in other fields. Among others, when a blast furnace is operating, an extremely large quantity of air, for example, as large as 5,000 to 12,000 $Nm^3$/min of air, is required. Atmospheric air may be compressed by a blower specially designed for supplying a large quantity of air to a blast furnace, to form a stream of air having a temperature of 150° to 250° C and a pressure of 3.5 to 5.0 $Kg/cm^2$ G. The stream of air so formed is further headed in hot air furnaces to a temperature of 500° to 1200° C before it is introduced into a blast furnace. Obviously, dehydration of atmospheric air at the input side of the blower would be technically less difficult than dehydration of compressed air at the discharge side of the blower.

However, when a large quantity of atmospheric air is dehydrated using a regenerative moisture abosrbent, a large quantity of hot air is required for the regeneration purpose, and, thus, it is necessary to provide a powerful external heat source. Some existing plants utilize electric energy, hot gases or steam as the external heat source. Obviously, this is not advantageous from the point of view of heat economy.

It would appear that air could be advantageously cooled and partially dehydrated by means of a cooler, before the air is subjected to the action of a regenerative moisture absorbent. However, if the air, which has passed the cooler and has had its temperature lowered and relative humidity increased, is brought into contact with the regenerative hygroscopic moisture absorbent, there is the possibility of the problem of the deliquescence of the moisture absorbent arising. While typical moisture absorbents, such as lithium chloride, are highly hygroscopic, they often undergo deliquescence when they have absorbed an excessive amount of moisture. The service life of a rotor having such a moisture absorbent impregnated therein will be shortened, if it is caused to operate under such conditions that deliquescence of the absorbent would occur.

Moreover, atmospheric air available in an iron foundry normally contains a quantity of impurities. When a large quantity of such air is treated by a rotor containing a moisture absorbent impregnated therein, those impurities are caught by and accumulated in the absorbent and adversely effect the absorbent.

It is the aim of the present invention to solve the problems discussed above.

More specifically, an object of the invention is to provide a dehydration assembly for dehydrating air to be supplied to a blast furnace wherein a waste gas available in an iron foundry may be utilized as a heat source for regenerating the used regenerative moisture absorbent.

Another object of the invention is to provide a dehydration assembly for dehydrating air to be supplied to a blast furnace by which cooled moist air may be dehydrated without the problem of the deliquescence of the used regenerative moisture absorbent arising.

A further object of the invention is to provide a dehydration assembly for dehydrating air to be supplied to a blast furnace by which atmospheric air containing a quantity of impurities, such as available in an iron foundry, may be dehydrated without suffering from reduction in the regenerative capacity of the absorbent due to contamination by those impurities.

A still further object of the invention is to provide a dehydration assembly for dehydrating air to be supplied to a blast furnace which is provided with means for preventing the regenerating hot combustion gas from leaking into the stream of the dehydrated air.

Other objects and advantages of the invention will be apparent from the following description and appended claims.

In accordance with the invention there is provided a dehydration assembly for dehydrating atmospheric air at the input side of a blower for use in the operation of a blast furnace, comprising:

a casing, the inside space of which is divided into regenerating and dehydrating zones by a partition plate;

at least one gas permeable rotor containing a regenerative moisture absorbent impregnated therein rotatably mounted in said casing so as to radially extend across the cross-sections of said regenerating and dehydrating zones;

a pre-cooler located in said dehydrating zone upstream of said rotor;

an after-cooler located in said dehydrating zone downstream of said rotor;

a relative humidity regulator located in said dehydrating zone between said pre-cooler and said rotor;

piping means for circulating the same heat transfer medium through said relative humidity regulator and said after-cooler;

a conduit for passing the dehydrated air leaving said after-cooler to the input side of the blower, and;

a conduit for introducing a hot combustion gas, obtained in a combustion device for burning a waste gas containing inflammable components, into said regenerating zone.

Preferably the gas permeable rotor comprises a layer containing the regenerative moisture absorbent and a layer containing an adsorbent capable of adsorbing impurities contained in the air to be dehydrated, said layer containing the adsorbent being superimposed on said layer containing the moisture absorbent and located upstream of said layer containing the moisture absorbent with respect to the stream of air in the dehydrating zone, whereby the air to be dehydrated may pass through said layer containing the adsorbent before it passes through said layer containing the moisture absorbent.

Preferably each clearance formed between each flat surface of the rotor and the end of the partition plate facing said flat surface of the rotor is sealed by a packing element securely fixed on said end having two spaced parallel arms along both edges of said end to form a sealed space and, for that sealed space formed upstream of the rotor with respect to the stream of hot combustion gas, there is provided means for communicating said sealed space with a region downstream of said rotor in the regenerating zone.

The invention will be further described with reference to the accompanying drawings which are illustrative embodiments of the invention and in which:

FIG. 1 diagrammatically illustrates an embodiment of the basic concept of the invention;

FIG. 2 is an enlarged vertical sectional view of the dehydration assembly involved in the arrangement of FIG. 1;

FIG. 3 is a diagrammatic view illustrating one form of circulation passages of a heat transfer medium for the various devices arranged in the dehydrating zone in the dehydration assembly of FIG. 2;

FIG. 4 is a diagrammatic view illustrating another form of circulation passages of a heat transfer medium for the various devices arranged in the dehydrating zone;

In the various figures the same reference numerals have been used for equivalent parts.

Figure 1:
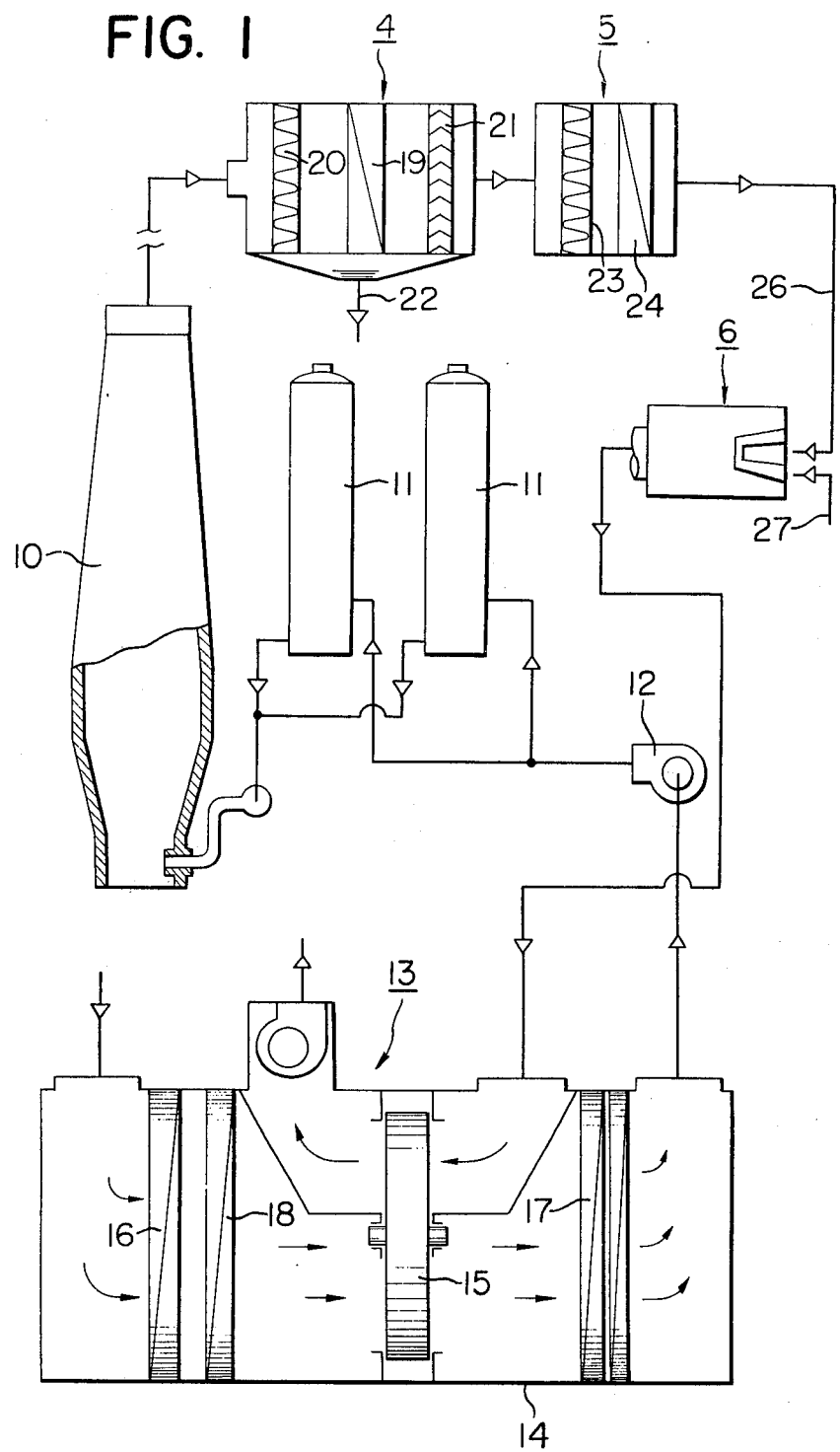

Referring to FIG. 1, the illustrated arrangement for supplying air to a blast furnace 10 comprises, in addition to hot air furnaces 11 and a blower or compressor 12 specially designed for use in the operation of a blast furnace, a dehydration assembly 13 for dehydrating air to be taken up by the blower 12, and an arrangement for converting a hot waste gas, such as a waste gas from the blast furnace, to a hot gas required for the regeneration of a regenerative hygroscopic material used in the dehydration assembly 13, the latter arrangement comprising a cooling dehydrater 4, a gas cleaner 5 and a combustion device 6.

The blower 12 is of such a size that it can provide 5,000 to 12,000 Nm$^3$/min of air, depending on the size of the blast furnace 10, that the air having a temperature of 150° to 250° C and a pressure of 3.5 to 5.0 Kg/cm$^2$G, at the output side of the blower.

The dehydration assembly 13, which will be described hereinafter in detail, comprises a casing 14 having operatively arranged therein a rotor 15 containing a regenerative hygroscopic substance impregnated therein, a pre-cooler 16, an after-cooler 17 and a relative humidity regulater 18.

The cooling dehydrater 4 comprises a casing having operatively arranged therein a cooler 19, through which cold water from a refrigerator (not shown) is circulated, a coarse filter 20 and an eliminator 21. A moist gas obtained by passing a waste gas from the blast furnace 10 through a conventional scrubber (not shown) is cooled and dehydrated by the cooling dehydrater 4. The gas introduced into the cooling dehydrater 4 contains a quantity of combustible substances and impurities. For example, it may contain 19.2% by volume of $CO_2$, 24.7% by volume of CO, 5.3% by volume of $H_2$, 50.3% by volume of $N_2$, 0.0001 g/Nm$^3$ of Na, 0.001 g/Nm$^3$ of K and a trace of S. When such a moist gas containing impurities is passed through the cooling dehydrater 4, the moisture in the gas is condensed and most of the impurities, including sodium hydroxide, potassium hydroxide and other impurities, are removed together with the condensed water by way of a drain 22.

The gas cleaner 5 comprises a casing having operatively arranged therein a filter 23 comprising a layer of an adsorbent such as active carbon and a high performance filter 24, for example, a HEPA filter. Any impurities which have survived the above-mentioned cooling and dehydration treatment will be removed by the gas cleaner 5.

The combustion device 6 is a gas burner equipped with a propane gas pilot burner. The cleaned gas coming from the gas cleaner 5 through a conduit 26 is burnt in the combustion device 6 by the aid of air supplied through a conduit 27. The combustion gas obtained in the combustion device 6 is a hot gas essentially composed of $CO_2$ and $N_2$ with few impurities. This hot gas is used for the regeneration of the hygroscopic substance impregnated in the rotor 15.

The details of the dehydration assembly 13 in accordance with the invention will now be described with reference to FIGS. 2 through 9.

Referring to FIG. 2, the illustrated dehydration assembly 13 comprises a generally rectangular steel casing 14, the inside space of which is divided into two spaces 29 and 30 by a partition plate 28, said spaces 29 and 30 constituting regenerating and dehydrating zones; a gas permeable rotor 15 containing a regenerative moisture absorbent impregnated therein rotatably mounted in said casing 14 so as to radially extend across the cross-sections of both regenerating and dehydrating zones 29 and 30; a pre-cooler 16 located in the dehydrating zone 30 upstream of said rotor 15; an after-cooler 17 located in the dehydrating zone 30 downstream of said rotor 15; a relative humidity regulator 18 located in the dehydrating zone 30 between said pre-cooler 16 and said rotor 15; piping means for circulating the same heat transfer medium through said relative humidity regulator 18 and said after-cooler 17 or a water-air heat exchanger 31 located downstream of said after-cooler 17 (the piping means is not shown in FIG. 2, but the details thereof are shown in FIGS. 3 and 4); a conduit 32 for passing the dehydrated air leaving said after-cooler 17 or water-air heated exchanger 31 to the blower 12, and; a conduit 33 for introducing the hot gas obtained in the combustion device 6 into the regenerating zone 29.

When the dehydration assembly is operating, the hot combustion gas is introduced into the regenerating zone 29 by means of a blower 34 or 34', which is mounted on the top of the casing 14 and is driven by a motor 35 or 35'. The hot gas is then caused to pass through the rotor and discharged from the output side of the blower 34 or 34'. Upon passing through the rotor 15 the hot gas regenerates the hygroscopic substance impregnated in the rotor 15 by taking away moisture from the hygroscopic substance. In the dehydrating zone 30, the atmospheric air is introduced into the assembly 13 by means of the blower 12, cooled and dehydrated by passing through the pre-cooler 16, and has its relative humidity regulated by passing through the relative humidity regulator 18. The air is then permitted to pass through the rotor 15. The moisture of the air is adsorbed by the hygroscopic substance impregnated in the rotor 15, whereby the air is dried. Thereafter, the air has its sensitive heat taken away by passing through the after-cooler 17 and the water-air heat exchanger, if any, and is then passed through the conduit 32 to the blower 12.

One of the important features of the dehydration assembly in accordance with the invention is the provision of the relative humidity regulator 18 and the piping means for circulating the same heat transfer medium through the regulator 18 and the after-cooler 17 or water-air heat exchanger 31, in order to regulate the relative humidity of the air to be passed through the rotor 15 in the dehydrating zone 30, thereby to avoid undesirable deliquescence of the moisture absorbent. Another feature of the dehydration assembly of the invention relates to the structure of the rotor which is specially designed so that undesirable contamination of the moisture absorbent with impurities contained in the air may be avoided. Still another feature of the dehydration assembly of the invention resides in the provision of sealing means which may prevent the hot regenerating gas from leaking through clearances between the rotor 15 and the partition plate 28 or through clearances surrounding the peripheral surface of the rotor 15. These and other features and advantages of the dehydration assembly of the invention will be described in detail hereinafter.

Figure 5:
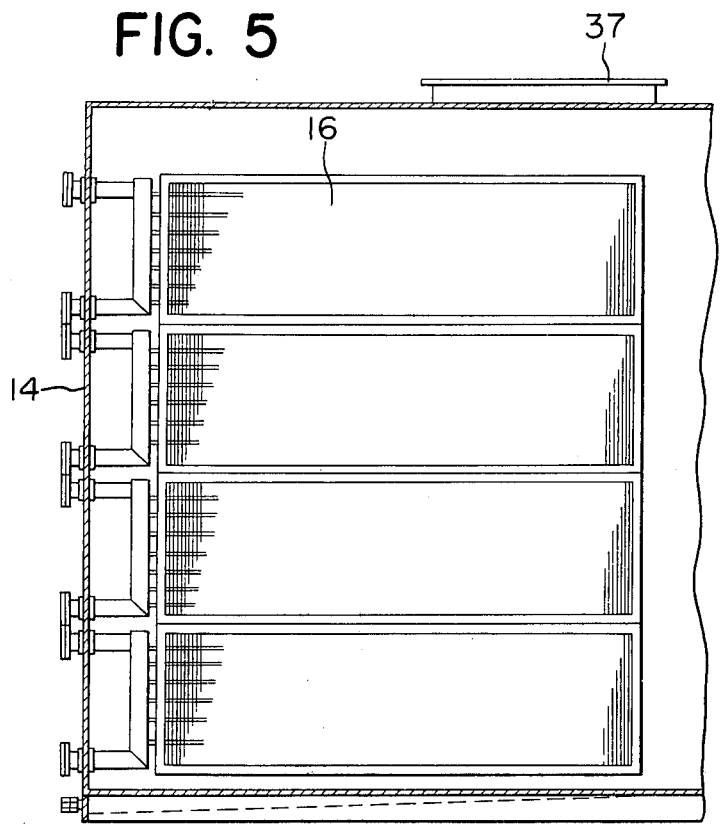
FIG. 5 is an enlarged cross-sectional view of the dehydration assembly of FIG. 2, taken along the line V—V, as seen from the direction indicated by the arrows V.

FIG. 3 is a diagrammatic view illustrating circulation passages of a heat transfer medium for the pre-cooler 16, the relative humidity regulator 18, after-cooler 17 and heat exchanger 31. These devices may have substantially the same structure. Typically, each device may be a finned tube heat exchanger as shown in FIG. 5. Water is circulated as a heat transfer medium through tubes of each of these heat exchangers. There is provided an independent water circulation passage 38 through which water is circulated by means of a pump 39 between the relative humidity regulator 18 and the heat exchanger 31. Through the pre-cooler 16 cold water prepared by a refrigerator 40 is circulated by means of a pump 41, whereas through the after-cooler 17 cold water from a cooling tower 42 is circulated by a pump 43. Cooling water for the refrigerator 40 is supplied from the cooling tower 42 by means of a pump 44. The function of the relative humidity regulator 18 is to transfer sensible heat of the dehydrated air leaving the after-cooler 17 to the air which has passed through the pre-cooler 16 and is about to enter the rotor 15, whereby reduction in the relative humidity of the air, which has passed through the pre-cooler 16, can be achieved without the need of any external heat source. In one working example, in which atmospheric air at a temperature of 35° C was introduced into the dehydrating zone 30 of the dehydration assembly of the invention, the air became a moist air having a temperature of 15° C and a relative humidity of 95% when it left the pre-cooler 16. When it left the relative humidity regulator 18 it had a temperature of 20° C and a relative humidity of 70%. By passing the air through the rotor 15, most of the moisture content of the air was removed and the temperature of the air reached 47° C. The air was then cooled to a temperature of 40° C by the after-cooler 17 and to 35° C by the heat exchanger 31. Thus, the relative humidity of the air, which enters the rotor 15, can be reduced to such a level that the hygroscopic substance, such as lithium chloride, impregnated in the rotor 15 will not undergo deliquescence.

FIG. 4 illustrates a piping system in accordance with a basic embodiment of the invention, which is simpler than that shown in FIG. 3 and in which the heat transfer-medium, namely water, which has passed through the after-cooler 17, is passed to and circulated through the relative humidity regulator 18. More specifically, cold water from the cooling tower 42 is introduced into the after-cooler 17, where it is somewhat warmed, and then passed through the piping 38 to the relative humidity regulator 18. The constitution shown in FIG. 4 is advantageous in that the heat exchanger is not necessary and the load of the cooling tower 42 may be reduced. Furthermore, the temperature of the water, which is circulated through the relative humidity regulator 18, may be somewhat higher than that in the case of FIG. 3, and thus, the relative humidity of the air passing through the regulator 18 may be reduced to a greater extent. The operation of the pre-cooler 16 is the same as in FIG. 3.

Figure 6:
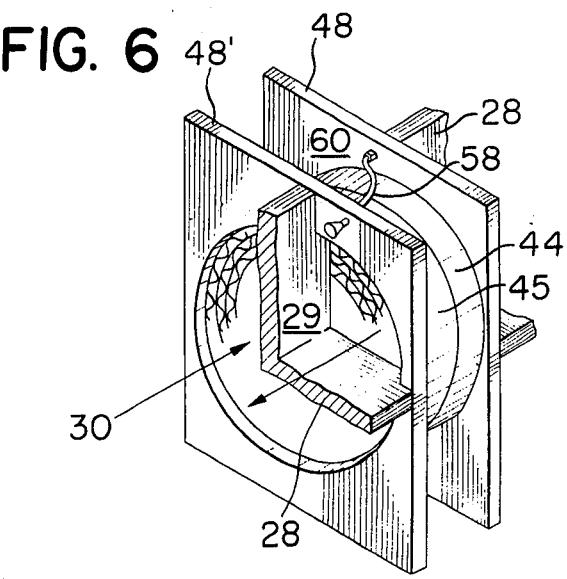
FIG. 6 is a perspective view showing one of the rotors of the dehydration assembly shown in FIG. 2.

FIG. 6 illustrates a specific form of the rotor 15 which may be used in the dehydration assembly of the invention. The illustrated rotor comprises a layer 44 containing a regenerative moisture absorbent and a layer 45 containing an adsorbent capable of adsorbing impurities contained in the air to be dehydrated, said layer 45 being located upstream of said layer 44 with respect to the stream of air in the dehydrating zone 30. The layer 44 comprises a gas permeable disc having a honeycomb structure made of asbestos material impregnated with a regenerative moisture absorbent such as lithium chloride. The layer 45 comprises a gas permeable disc having a honeycomb structure made of asbestos material filled with a particulate adsorbent such as active carbon, zeolite and the like. Both layers 44 and 45 are preferably bonded together to form a unitary rotor.

When the rotor is operating, sulfur oxides and other impurities contained in the moist air passing through the layer 45 are adsorbed by the adsorbent, and in the regenerating zone 29 the adsorbed impurities are released from the adsorbent by the hot gas and discharged together with the waste hot gas. Thus, the adsorbent is regenerated, and this cycle of adsorption and regeneration is repeated. Since the moist air is caused to pass through the layer 45 containing the adsorbent before it passes through the layer 44 containing the moisture adsorbent, the impurities are prevented from being caught by the moisture absorbent, such as lithium chloride, and from adversely affecting the absorbent. As a matter of course, the moisture in the air is absorbed by the absorbent at the time the moist air passes through the layer 44 containing the absorbent, and the absorbed moisture is released by the hot gas in the regenerating zone 29 and discharge together with the waste hot gas. Thus, the moisture absorbent is regenerated.

Figure 7:
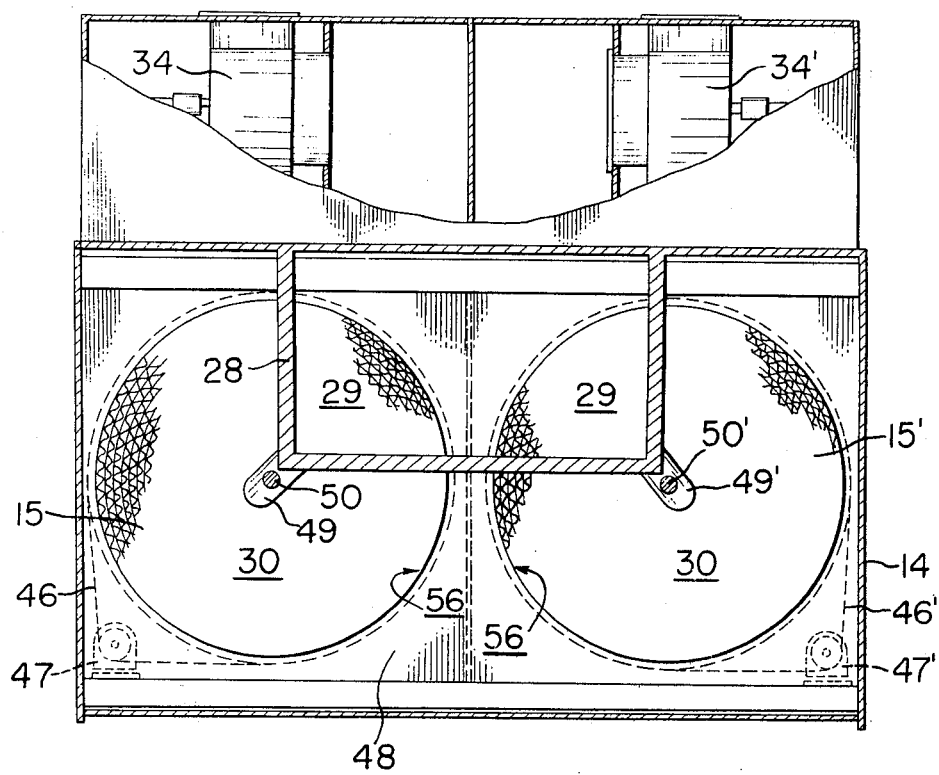
FIG. 7 is a cross-sectional view of the dehydration assembly of FIG. 2, taken along the line VII—VII, as seen from the direction indicated by the arrows VII.

FIG. 7 is a cross-sectional view of the dehydration assembly of FIG. 2, taken along the line VII—VII, as seen from the direction indicated by arrows VII, and illustrates a manner of mounting the rotors 15 and 15'. As seen from FIG. 7, two similar rotors 15 and 15' are mounted in a row. The rotors 15 and 15' are independently caused to rotate by driving endless belts 46 and 46' extending over the peripheral surfaces of the rotors by means of motors 47 and 47', respectively. Clearances between each rotor and the rectangular casing 14 are shielded by blind plates 48 and 48' in a manner as shown in FIGS. 6 and 7. The endless belt 47 or 47' extending over the peripheral surface of each rotor is positioned between the blind plates 48 and 48'. The reference numerals 49 and 49' designate bearings securely supported by the partition plate 28, and the reference numerals 50 and 50' designate shafts of the rotors 15 and 15', respectively. The hot regenerating gas is caused by the blowers 34 and 34' to flow through the regenerating zone 29 in a direction perpendicular to the sheet of paper, on which FIG. 7 is drawn, from the face to the back. Whereas the air to be dehydrated is caused by the blower 12 to flow through the dehydrating zone 30 in the opposite direction, that is in a direction perpendicular to the sheet of paper on which FIG. 7 is drawn from the back to the face.

When the dehydration assembly is operating a part of the hot regenerating gas, which has reached each rotor tends to leak through a clearance formed between an end of the partition plate 28 and a flat surface of the rotor facing said end into the stream of the dehydrated air, which has passed through the rotor in the dehydrating zone 30. This is because the blower 12 is much more powerful than the blower 34 or 34' and also because the pressure of the dehydrated air which has passed through the rotor is lower than that of the hot regeneration gas which has just reached the rotor in the regenerating zone 29. Such leakage of the hot combustion gas contaminates the dehydrated air and causes various problems.

Figure 8:
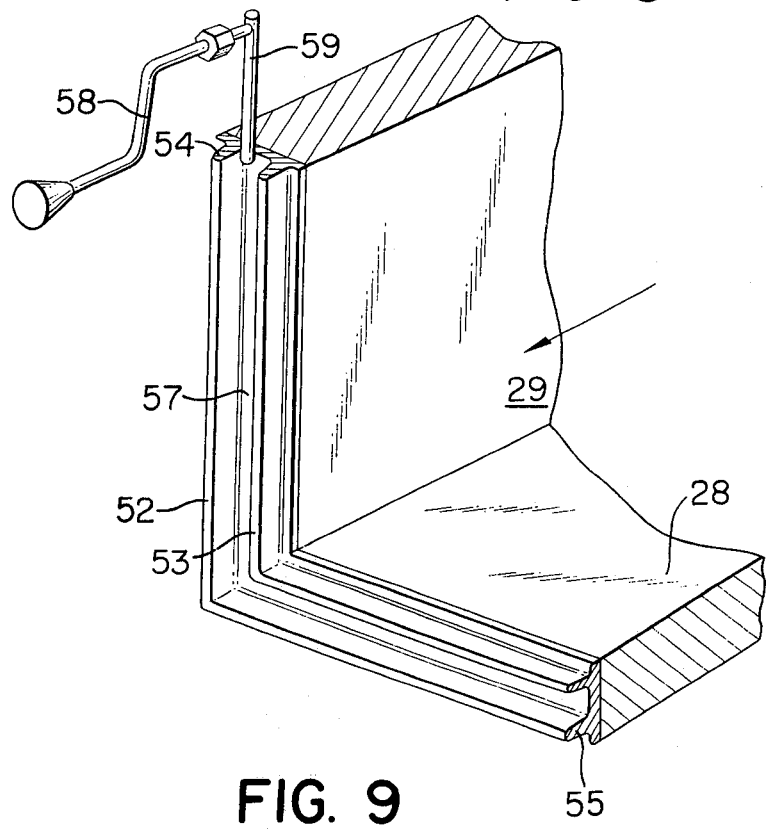
FIG. 8 is a partially cut away perspective view for illustrating a sealing means between the rotor and the partition plate.
Figure 9:
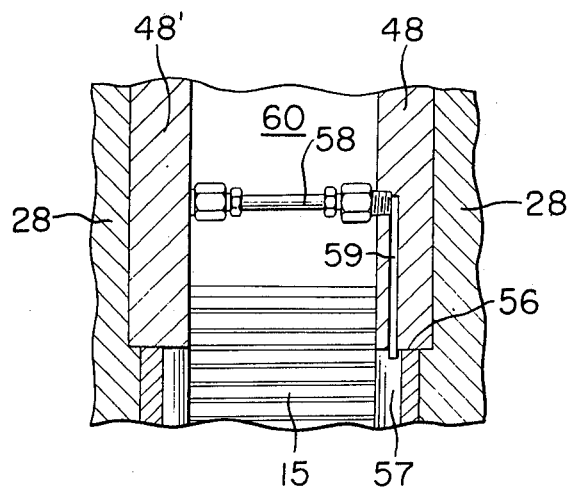
FIG. 9 is an enlarged cross-sectional view for illustrating the sealing means between the rotor and the partition plate.

In accordance with a special aspect of the invention there is provided means for preventing the regenerating hot combustion gas from leaking into the stream of the dehydrated air. FIG. 8 is an enlarged partially cut away perspective view illustrating that end of the particular plate 28 which is designated by the reference numeral 51 in FIG. 2. On this end of the partition plate 28 facing one of the flat surfaces of each rotor there is securely fixed an L-shaped packing element having outwardly extruding spaced parallel arms 52 and 53 along both edges of that end of the partition plate 28. The packing element is so arranged that free edges of its arms 52 and 53 contact one of the flat surfaces of the rotating rotor and that the outermost ends 54 and 55 of each arm are in abutting engagement with an edge of an opening 56 provided in the blind plate 48 (FIGS. 7 and 9). Thus, there is formed a substantially sealed space 57 between the arms 52 and 53 of the packing element. A similar sealed space is also formed between the opposite flat surface of the rotor and the end of the partition plate facing said flat surface. But only the sealed space 57 formed at that position designated by the reference numeral 51 in FIG. 2, is communicated with a region downstream of the rotor in the regenerating zone 29 by means of a communicating tube 58. Now referring to FIGS. 6 and 9, the communicating tube 58 is so arranged that it extends from the sealed space 57, passes through the blind plate 48 (as designated by the reference numeral 59 in FIG. 9), then through a space 60 between both blind plates 48 and 48' and then through the blind plate 48', and finally opens to a region downstream of the rotor in the regenerating zone 29. By this means the regenerating hot combustion gas may be substantially prevented from leaking into the stream of the dehydrated air. Since the region downstream of the rotor in the regenerating zone has a negative pressure higher than that of the region upstream of the rotor in the regenerating zone, any traces of the hot gas which has gone from the latter region beyond the arm 53 of the packing element into the space 57 can be suctioned through the communicating tube 58 into the former region without being allowed to go beyond the arm 52.

While not shown in the drawings, a clearance formed between the peripheral surface of each rotor 15 or 15' and the opening 56 provided in each blind plate 48 or 48' may be sealed by an annular packing element securely fixed on the circumferential edge of the opening 56 to prevent gas leakage through said clearance.

Although the invention has been described in its preferred form with a certain degree of particularity, it is understood that the present disclosure of the preferred form has been changed in the details of construction and the combination and arrangement of parts may be restored to without departing from the spirit and the scope of the invention as hereinafter claimed.

We claim:

1. A dehydration assembly for dehydrating atmospheric air at the input side of a blower for use in the operation of a blast furnace, comprising:

a casing, the inside space of which is divided into regenerating and dehydrating zones by a partition plate;

at least one gas permeable rotor containing a regenerative moisture absorbent impregnated therein rotatably mounted in said casing so as to radially extend across the cross-sections of said regenerating and dehydrating zones, said rotor having two opposing flat surfaces with a clearance therebetween;

a pre-cooler located in said dehydrating zone upstream of said rotor;

an after-cooler located in said dehydrating zone downstream of said rotor;

a relative humidity regulator located in said dehydrating zone between said pre-cooler and said rotor;

piping means for circulating a heat transfer medium through said relative humidity regulator and said after-cooler;

a conduit for passing the dehydrated air leaving said after-cooler to the input side of the blower, and;

a conduit for introducing a hot combustion gas, obtained in a combustion device for burning a waste gas containing inflammable components, into said regenerating zone.

2. A dehydration assembly in accordance with claim 1, wherein said gas permeable rotor comprises a layer containing the regenerative moisture absorbent and a layer containing an adsorbent capable of adsorbing impurities contained in the air to be dehydrated, said layer containing the adsorbent being superimposed on said layer containing the moisture absorbent and located upstream of said layer containing the moisture absorbent with respect to the stream of air in the dehydrating zone, whereby the air to be dehydrated may pass through said layer containing the adsorbent before it passes through said layer containing the moisture absorbent.

3. A dehydration assembly in accordance with claim 1, wherein each clearance formed between each flat surface of said rotor and the end of said partition plate facing said flat surface of the rotor is sealed by a packing element securely fixed on said end having two spaced parallel arms along both edges of said end to form a sealed space and wherein for that sealed space formed upstream of the rotor with respect to the stream of hot combustion gas there is provided means for communicating said sealed space with a region downstream of said rotor in the regenerating zone.

4. A dehydration assembly for dehydrating atmospheric air at the input side of a blow for use in the operation of a blast furnace, comprising:
- a casing, the inside space of which is divided into regenerating and dehydrating zones by a partition plate;
- at least one gas permeable rotor containing a regenerative moisture absorbent impregnated therein rotatably mounted in said casing so as to radially extend across the cross-sections of said regenerating and dehydrating zones, said rotor having two opposing flat surfaces with a clearance therebetween;
- a pre-cooler located in said dehydrating zone upstream of said rotor;
- an after-cooler located in said dehydrating zone downstream of said rotor;
- a water-air heat exchanger located in said dehydrating zone downstream of said after-cooler;
- a relative humidity regulator located in said dehydrating zone between said pre-cooler and said rotor;
- piping means for circulating a heat transfer medium through said relative humidity regulator and said water-air heat exchanger;
- a conduit for passing the dehydrated air leaving said water-air heat exchanger to the input side of the blower, and;
- a conduit for introducing a hot combustion gas, obtained in a combustion device for burning a waste gas containing inflammable components, into said regenerating zone.

5. A dehydration assembly in accordance with claim 4, wherein said gas permeable rotor comprises a layer containing the regenerative moisture absorbent and a layer containing an adsorbent capable of adsorbing impurities contained in the air to be dehydrated, said layer containing the adsorbent being superimposed on said layer containing the moisture absorbent and located upstream of said layer containing the moisture absorbent with respect to the stream of air in the dehydrating zone, whereby the air to be dehydrated may pass through said layer containing the adsorbent before it passes through said layer containing the moisture absorbent.

6. A dehydration assembly in accordance with claim 4, wherein each clearance formed between each flat surface of said rotor and the end of said partition plate facing said flat surface of the rotor is sealed by a packing element securely fixed on said end having two spaced parallel arms along both edges of said end to form a sealed space and wherein for that sealed space formed upstream of the rotor with respect to the stream of hot combustion gas there is provided means for communicating said sealed space with a region downstream of said rotor in the regenerating zone.

* * * * *